(12) United States Patent
Foster et al.

(10) Patent No.: US 12,320,409 B2
(45) Date of Patent: Jun. 3, 2025

(54) LINEAR DRIVE ASSEMBLY

(71) Applicant: Kerr Machine Co., Sulphur, OK (US)

(72) Inventors: Kelcy Jake Foster, Sulphur, OK (US); Micheal Cole Thomas, Azle, TX (US); Christopher Todd Barnett, Stratford, OK (US); Nicholas Son, Davis, OK (US); John Keith, Ardmore, OK (US)

(73) Assignee: Kerr Machine Co., Sulphur, OK (US)

( * ) Notice: Subject to any disclaimer, the term of this patent is extended or adjusted under 35 U.S.C. 154(b) by 0 days.

(21) Appl. No.: 18/765,766

(22) Filed: Jul. 8, 2024

(65) Prior Publication Data

US 2025/0020192 A1    Jan. 16, 2025

Related U.S. Application Data

(60) Provisional application No. 63/513,501, filed on Jul. 13, 2023.

(51) Int. Cl.
| | |
|---|---|
| *F16H 21/28* | (2006.01) |
| *F04B 53/14* | (2006.01) |
| *F16C 5/00* | (2006.01) |
| *F16C 33/10* | (2006.01) |
| *F16H 57/01* | (2012.01) |
| *F16H 57/04* | (2010.01) |

(52) U.S. Cl.
CPC ........... *F16H 21/28* (2013.01); *F04B 53/146* (2013.01); *F16C 5/00* (2013.01); *F16C 33/1055* (2013.01); *F16C 33/1065* (2013.01); *F16C 33/108* (2013.01); *F16H 57/01* (2013.01); *F16H 57/042* (2013.01)

(58) Field of Classification Search
CPC ...... F04B 53/146; F16C 5/00; F16C 33/1055; F16C 33/1065; F16C 33/108; F16H 21/28; F16H 57/01; F16H 57/042
See application file for complete search history.

(56) References Cited

U.S. PATENT DOCUMENTS

| | | |
|---|---|---|
| 1,836,498 A | 12/1931 | Gustav |
| 1,873,482 A | 8/1932 | Rogatchoff |
| 2,269,680 A | 1/1942 | Naab |
| 2,771,846 A | 11/1956 | Horton et al. |
| 2,957,422 A | 10/1960 | Loeber |

(Continued)

FOREIGN PATENT DOCUMENTS

| | | |
|---|---|---|
| EP | 2494140 A1 | 5/2017 |
| GB | 1178682 A | 1/1970 |

*Primary Examiner* — Matthew Wiblin
(74) *Attorney, Agent, or Firm* — Tomlinson McKinstry, P.C.

(57) ABSTRACT

A pair of wear grooves for a linear drive assembly. One wear groove is disposed on a wear plate attached to a crosshead. This wear groove is on a front edge of the wear plate, and does not intersect any lubrication groove. Another wear groove is disposed circumferentially about an inner wall of a crosshead guide. Each of the wear grooves is observable to an operator without fully disassembling the crosshead and the crosshead guide, and each is observable from a single side of the crosshead guide. Should the wear groove not be observable, the associated component should be replaced. Should the wear groove be observable, the remaining life of the component can be determined from the groove's depth.

16 Claims, 8 Drawing Sheets

(56) References Cited

U.S. PATENT DOCUMENTS

| | | | |
|---|---|---|---|
| 3,005,412 A | 10/1961 | Camp | |
| 4,470,771 A | 9/1984 | Hall et al. | |
| 4,494,415 A | 1/1985 | Elliston | |
| 4,553,298 A | 11/1985 | Grable | |
| 4,566,370 A | 1/1986 | Hanafi | |
| 4,593,608 A | 6/1986 | Corey et al. | |
| 4,872,395 A | 10/1989 | Bennitt et al. | |
| 5,031,512 A * | 7/1991 | Graziani | F16C 5/00 74/44 |
| 5,507,219 A | 4/1996 | Stogner | |
| 7,032,690 B2 * | 4/2006 | Ramey | E21B 19/24 175/57 |
| 7,610,847 B2 | 11/2009 | McKelroy | |
| 7,811,064 B2 | 10/2010 | Allen | |
| 8,083,504 B2 | 12/2011 | Williams et al. | |
| 8,528,462 B2 | 9/2013 | Pacht | |
| 8,701,546 B2 | 4/2014 | Pacht | |
| 10,267,308 B2 | 4/2019 | Bagagli et al. | |
| 10,352,321 B2 | 7/2019 | Byrne et al. | |
| 10,393,113 B2 | 8/2019 | Wagner | |
| 10,677,380 B1 | 6/2020 | Surjaatmadja et al. | |
| 10,871,227 B1 | 12/2020 | Belshan et al. | |
| 11,162,479 B2 | 11/2021 | Thomas et al. | |
| 11,208,996 B2 | 12/2021 | Foster et al. | |
| 11,635,068 B2 | 4/2023 | Foster et al. | |
| 11,953,000 B2 | 4/2024 | Foster et al. | |
| 2008/0006148 A1 * | 1/2008 | McKelroy | F04B 53/144 92/190 |
| 2010/0038070 A1 | 2/2010 | Blanco et al. | |
| 2010/0129249 A1 | 5/2010 | Bianchi | |
| 2012/0141308 A1 | 6/2012 | Saini | |
| 2014/0348677 A1 | 11/2014 | Moeller et al. | |
| 2015/0132152 A1 | 5/2015 | Lazzara | |
| 2015/0132157 A1 | 5/2015 | Whaley et al. | |
| 2015/0159647 A1 | 6/2015 | Dille et al. | |
| 2016/0090980 A1 | 3/2016 | Howard et al. | |
| 2016/0208797 A1 | 7/2016 | Ladd | |
| 2016/0369792 A1 | 12/2016 | Wagner | |
| 2017/0211565 A1 | 7/2017 | Morreale | |
| 2018/0045187 A1 | 2/2018 | Nagel et al. | |
| 2018/0193895 A1 * | 7/2018 | Johnson | F16C 29/02 |
| 2019/0145391 A1 | 5/2019 | Davids | |
| 2019/0277279 A1 | 9/2019 | Byrne et al. | |
| 2019/0277341 A1 | 9/2019 | Byrne et al. | |
| 2020/0362678 A1 | 11/2020 | Lesko | |
| 2020/0386222 A1 | 12/2020 | Pham et al. | |
| 2021/0148346 A1 | 5/2021 | Foster et al. | |
| 2022/0389916 A1 | 12/2022 | Keith et al. | |
| 2023/0213065 A1 * | 7/2023 | Zhang | F04B 53/14 384/13 |

* cited by examiner

LINEAR DRIVE ASSEMBLY

SUMMARY

The present invention is directed to a linear drive assembly. The linear drive assembly comprises a crosshead and a pair of wear plates. The crosshead is configured to be installed within a crosshead guide and comprises upper and lower surfaces. The pair of wear plates are removably attached to a corresponding one of the upper and lower surface of the crosshead. Each wear plate has an outer surface and a front edge. Each plate has at least one lubricant groove and at least one plate wear groove. The at least one lubricant groove is formed in the outer surface of the wear plate and is in fluid communication with lubricant ports formed in the crosshead. The at least one plate wear groove is formed in the outer surface of the wear plate and is distinct from the at least one lubricant groove. The at least one wear plate groove is not in fluid communication with any lubricant port formed in the crosshead. The at least one wear plate groove opens on the front edge of the wear plate.

In another aspect, the invention is directed to a kit. The kit comprises a crosshead guide, a linear drive assembly, and a first wear plate. The crosshead guide has a longitudinal bore formed therein. The linear drive assembly is configured to be installed within the longitudinal bore of the crosshead guide. The linear drive assembly comprises upper and lower surfaces and defines a lubricant channel in the upper surface and the lower surface.

The first wear plate is configured for removable attachment to the upper surface of the linear drive assembly. The first wear plate is defined by an inner surface conforming to the upper surface of the linear drive assembly, an outer surface, and a front edge. At least one lubricant groove is formed within the outer surface of the first wear plate. A lubricant port interconnects the inner surface to the outer surface and intersects the at least one lubricant groove. The at least one wear groove is formed in the outer surface of the first wear plate and is distinct from the at least one lubricant groove.

DETAILED DESCRIPTION

Figure 1:
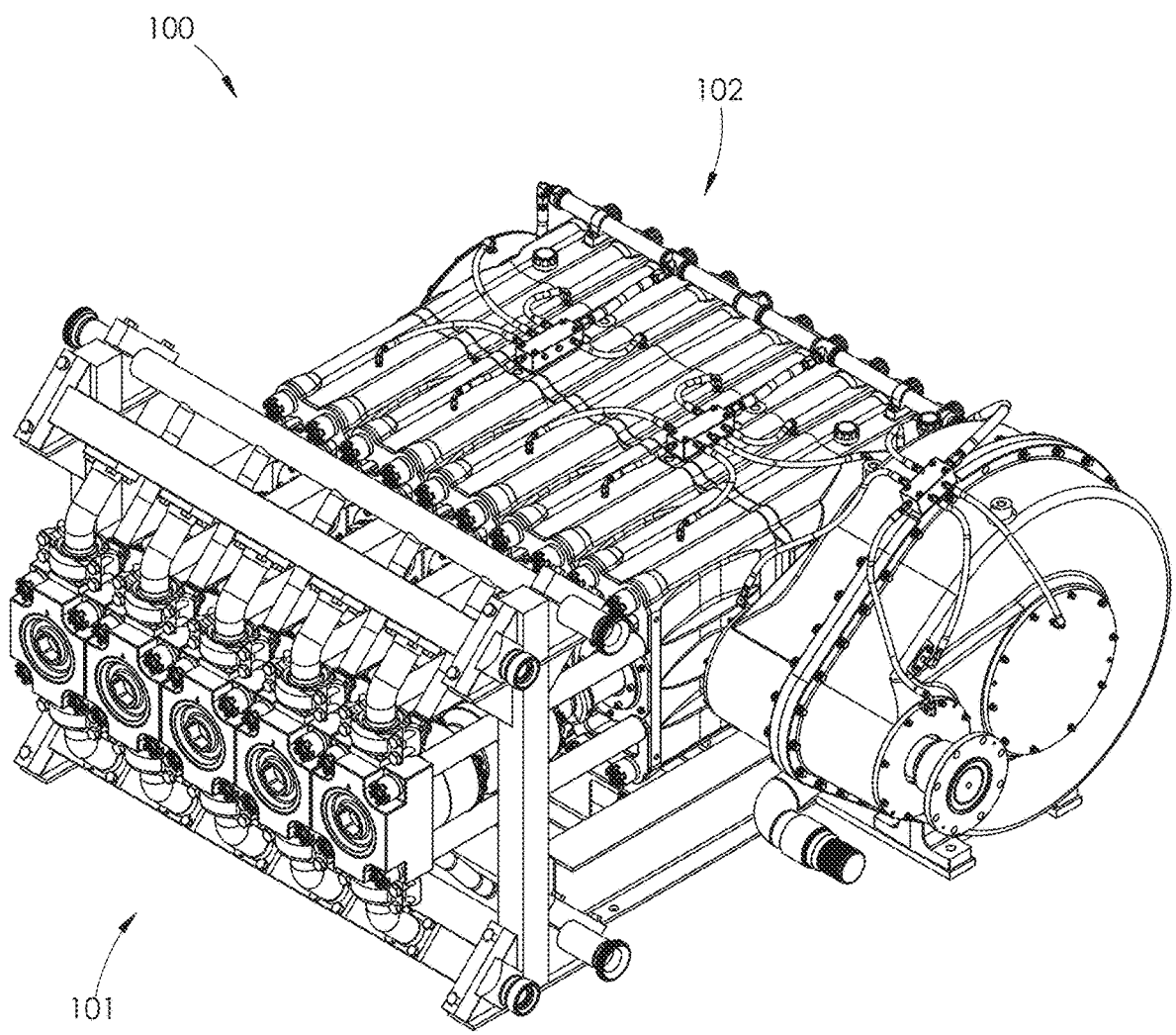
FIG. 1 is a front perspective view of one embodiment of a high-pressure pump.
Figure 2:
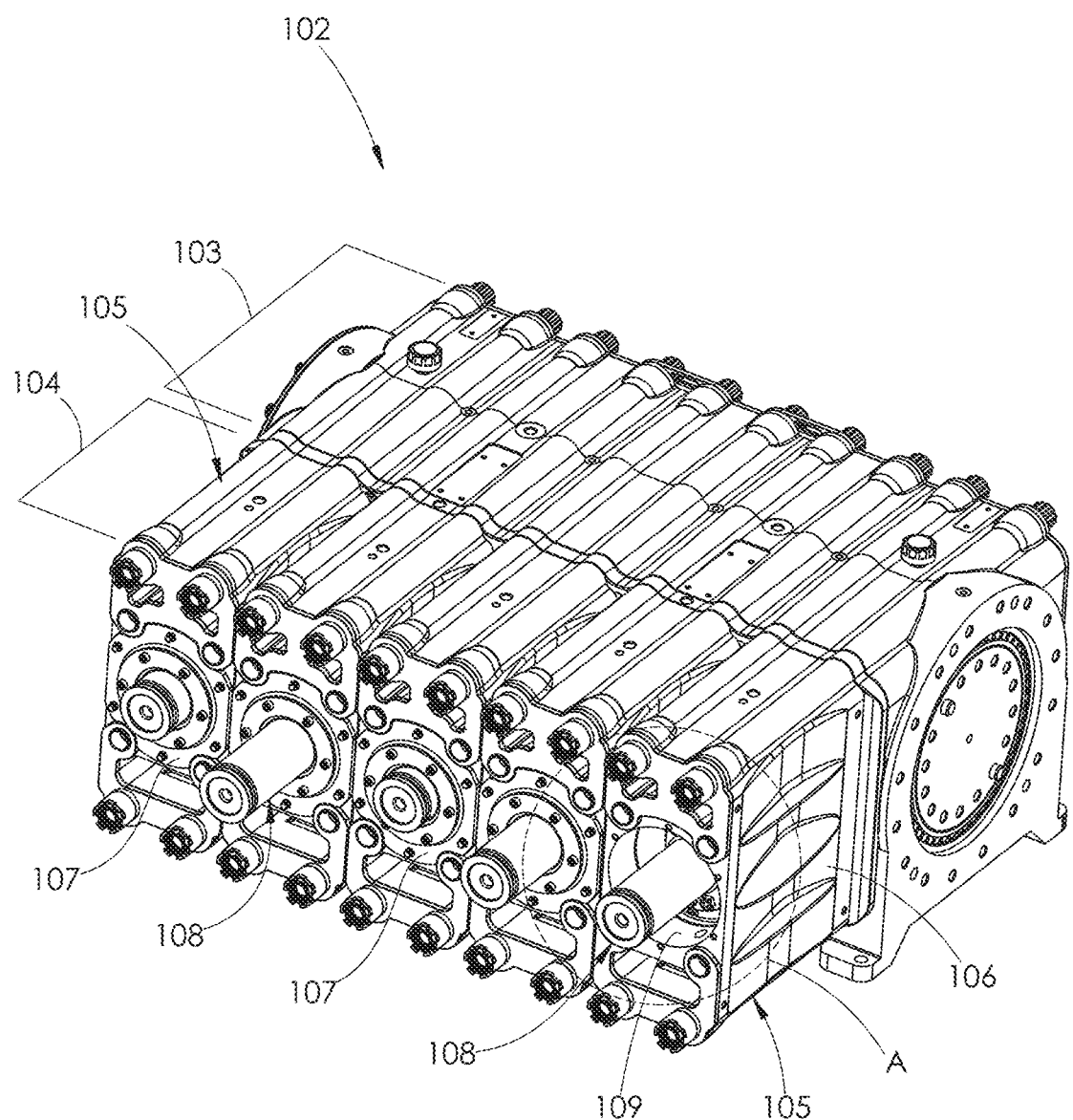
FIG. 2 is a front perspective view of the power end assembly shown in FIG. 1.
Figure 3:
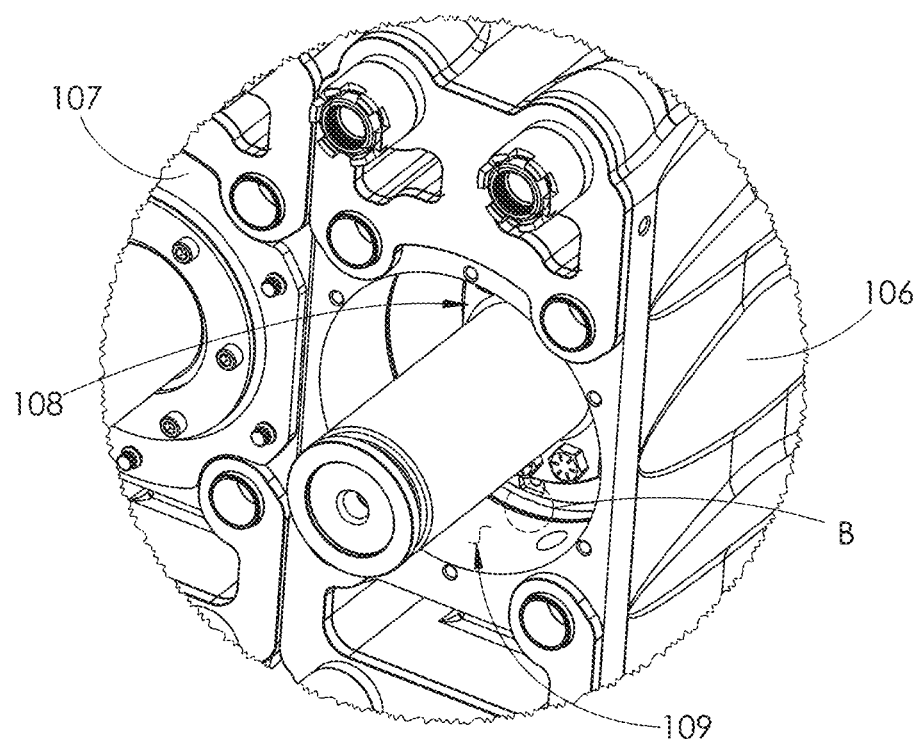
FIG. 3 is an enlarged view of area A, shown in FIG. 2.
Figure 7:
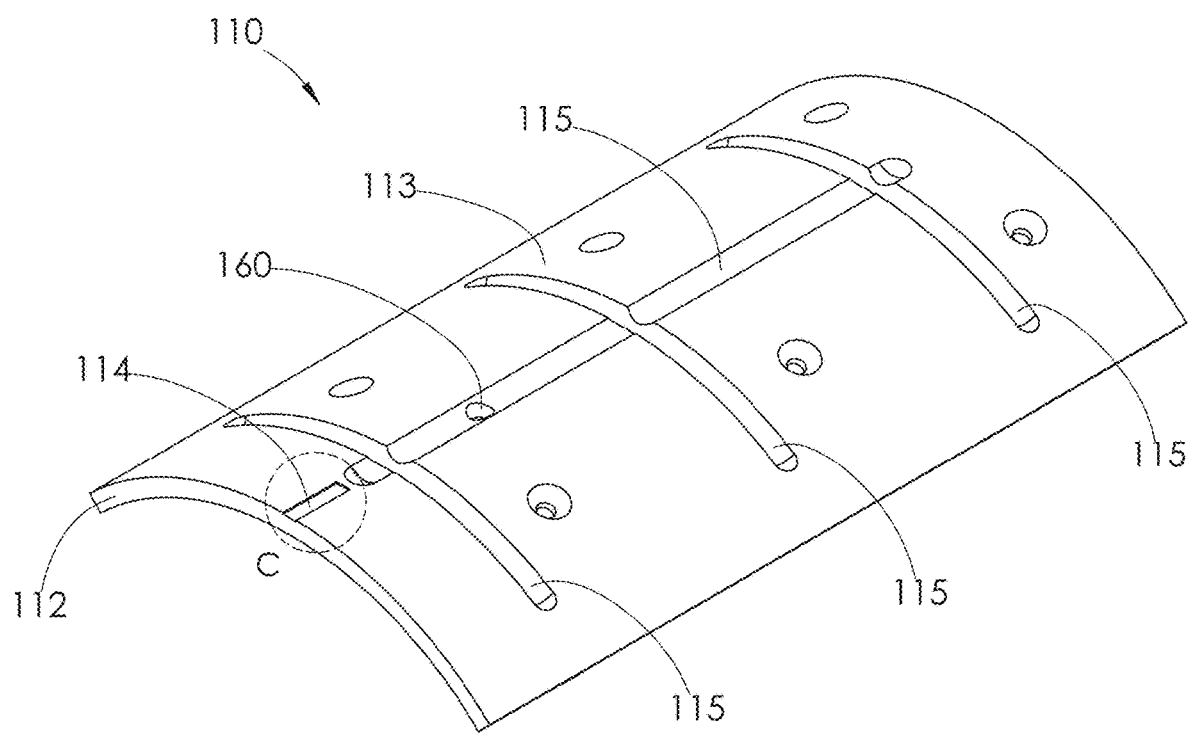
FIG. 7 is a top perspective view of one of the wear plates shown in FIG. 6.
Figure 8:
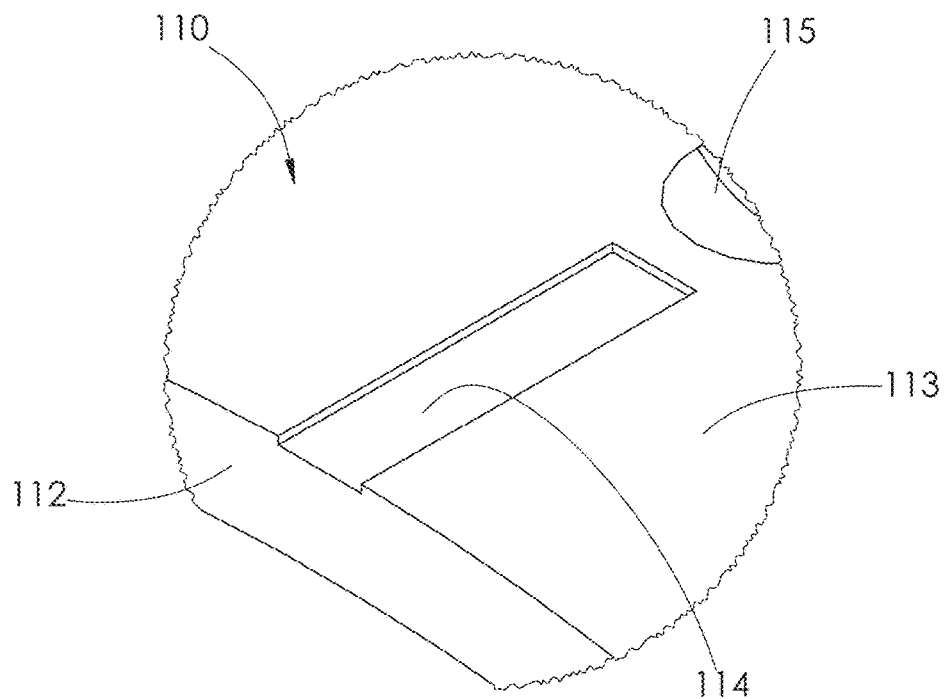
FIG. 8 is an enlarged view of area C, shown in FIG. 7.
Figure 9:
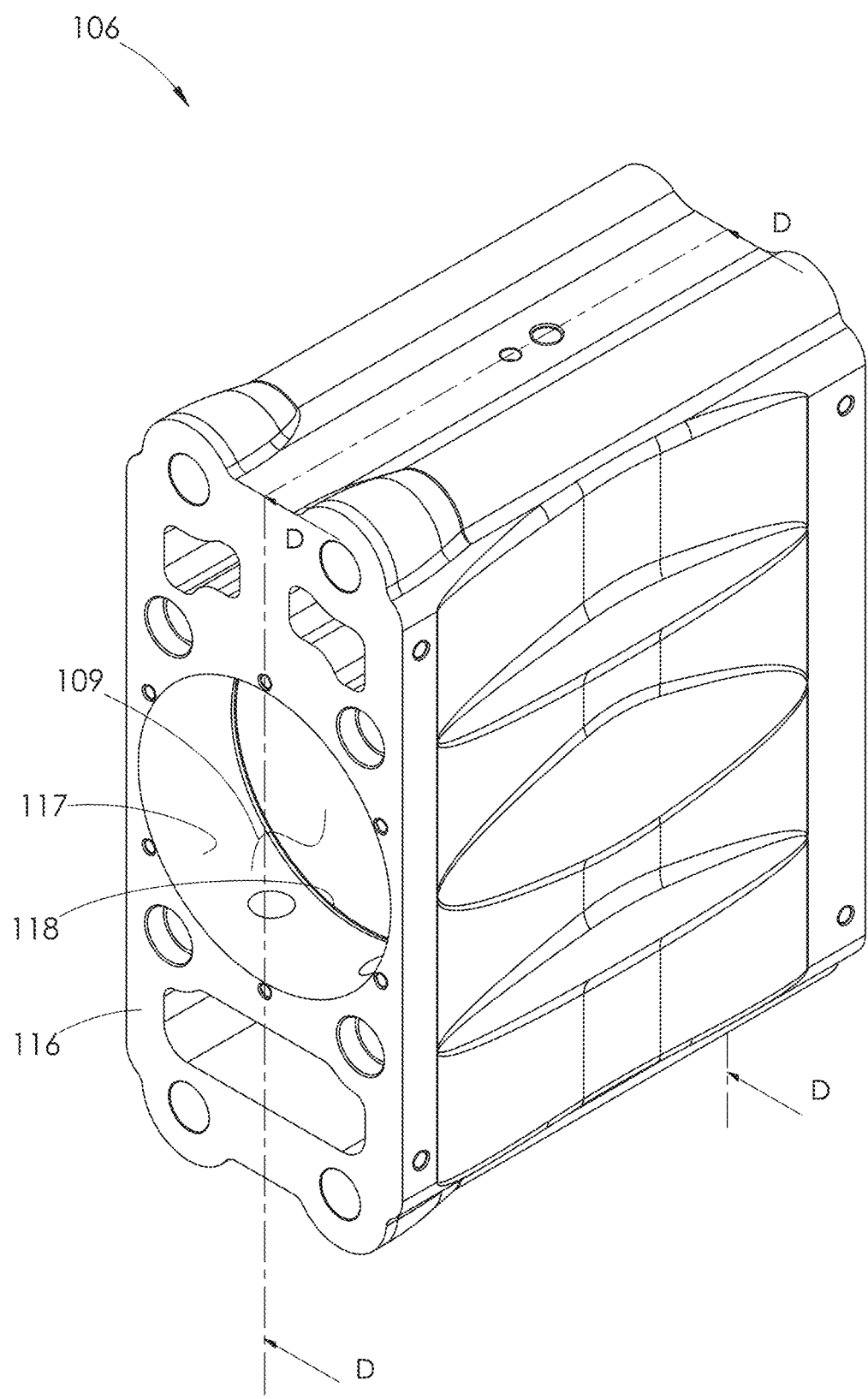
FIG. 9 is a front perspective view of one of the crosshead guides used within the power end assembly shown in FIG. 2.
Figure 10:
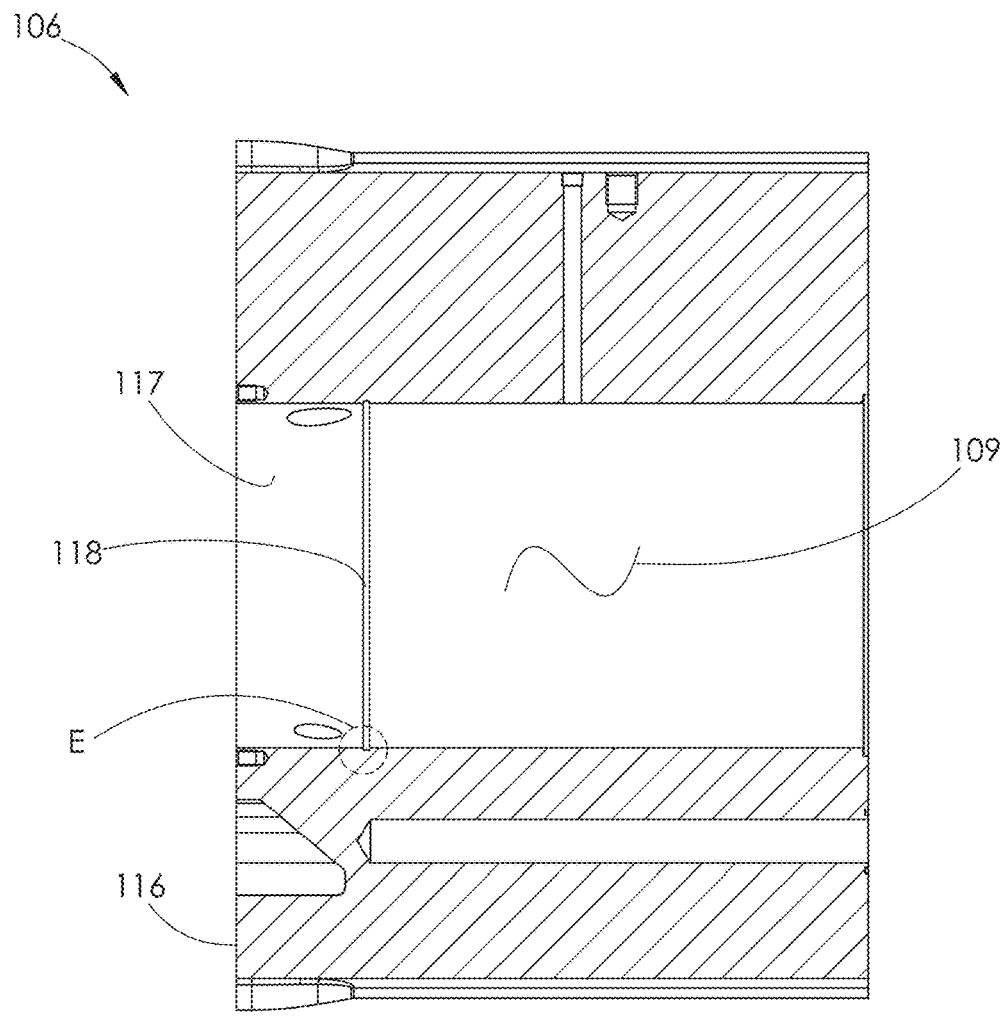
FIG. 10 is a cross-sectional view of the crosshead guide shown in FIG. 9, taken along line D-D.

Turning now to FIGS. 1-11, one embodiment of a high-pressure pump 100 is shown. The high-pressure pump 100 comprises a fluid end assembly 101 attached to a power end assembly 102 as shown in FIG. 1. The power end assembly 102, shown in FIG. 2, comprises a crank section 103 joined to a crosshead section 104. Continuing with FIG. 2, the crosshead section 104 comprises a plurality of crosshead guide assemblies 105 situated in a side-by-side relationship. Each crosshead guide assembly 105 comprises a crosshead guide 106, a pony rod cover 107, and a linear drive assembly 108. A crosshead bore 109 is formed within each crosshead guide 106, as shown in FIGS. 9-10, and each crosshead bore 109 is sized to receive a portion of a linear drive assembly 108 which includes a crosshead, as shown in FIGS. 2-3. Continuing with FIGS. 5-8, the linear drive assembly 108 comprises a plurality of wear plates 110 and a plurality of wear plate fasteners 111.

One such high-pressure pump 100 is disclosed in U.S. Pat. No. 11,953,000, issued to Foster et al., the entire contents of which are incorporated herein by reference.

Each crosshead bore 109 and linear drive assembly 108 are configured to allow the operator to easily determine the amount of wear on the crosshead bore 109 and wear plates 110. Knowing the amount of wear on the crosshead bore 109 and/or the wear plates 110 eliminates the need to further disassemble the power end assembly 102 during maintenance to measure the amount of wear on the components thus saving time.

Referring now to FIGS. 7-8, a wear plate 110 is shown. The wear plate 110 comprises a front surface 112 and an outer surface 113. The outer surface 113 comprises a wear indicator groove 114 and a plurality of lubrication channels 115. The lubrication channels 115 are formed in the outer surface 113 and have a lubrication port 160 disposed through the wear plate 110. The lubrication port 160 is in fluid communication with a lubrication passage 161 (FIG. 6) formed in the crosshead of the linear drive assembly 108. In this way, lubricant may be distributed from within the linear drive assembly 108 to the lubrication channel 115 of each wear plate 110. As shown, the lubrication channel 115 comprises a longitudinal passage and intersecting radial passages. Thus, the intersecting radial passage may be characterized as "substantially perpendicular" to the longitudinal passage, as it extends substantially at a ninety degree angle relative to the longitudinal passage on the wear plate 110. However, the wear plate 110 may have a curvature, along which the radial path extends.

The wear indicator groove 114 is separate and distinct from the lubrication channels 115. Specifically, the wear indicator groove 114 is not in fluid communication with the lubrication channels 115. The wear indicator groove 114 intersects the front surface 112 so that when the wear plate 110 is viewed from the front the wear indicator groove 114 appears as a notch in the outside radius of the front surface 112, which can be seen in FIG. 4. As shown in this embodiment, the wear indicator groove 114 is located approximately centered on the circumference of the outer surface 113. However, the wear indicator groove 114 may be located anywhere along the circumference of the outer surface 113. Also, the wear indicator groove 114 is shown extending longitudinally perpendicular to the front surface 112. The longitudinal distance is only constrained by the necessity to not intersect any lubrication channel 115. Additionally, the only restriction on circumferential width of the wear indicator groove 114 is that it must be less than the total circumferential length of the outer surface 113 allowing for a visual comparison to determine wear on the wear plate 110. The depth of the wear indicator groove 114 is 0.050 to 0.075 inches but may be larger or smaller.

Figure 11:
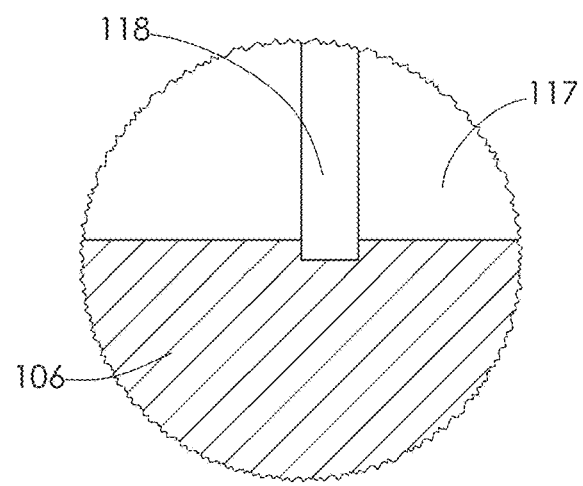
FIG. 11 is an enlarged view of area E, shown in FIG. 10.

Referring now to FIGS. 9-11, a crosshead guide 106 is shown. The crosshead guide 106 comprises a front surface 116 and a crosshead bore 109. The crosshead bore 109 comprises a bore wall 117 and a wear indicator groove 118. The wear indicator groove 118 is formed around the entire circumference of the bore wall 117. The longitudinal position of the wear indicator groove 118 is anywhere between the front surface 116 of the crosshead guide 106 and the location of the front surface 112 of the wear plate 110 when the linear drive assembly 108 is fully retracted. The depth of the wear indicator groove 118 is 0.050 to 0.075 inches but may be larger or smaller.

The wear indicator groove 118 of the crosshead bore 109 may be formed in only a portion of the circumference of the bore wall 117 or there may be a plurality of wear indicator grooves 118 formed in portions of the circumference of the bore wall 117. If a plurality of partially circumferential wear indicator grooves 118 is used they may be spaced longitudinally. There may also be a plurality of fully circumferential wear indicator grooves 118 formed in the bore wall 117 which would be longitudinally spaced. It is also contemplated that one or more wear indicator grooves 118 may be formed in the bore wall 117 parallel to, or at an angle to, the longitudinal axis.

Figure 4:
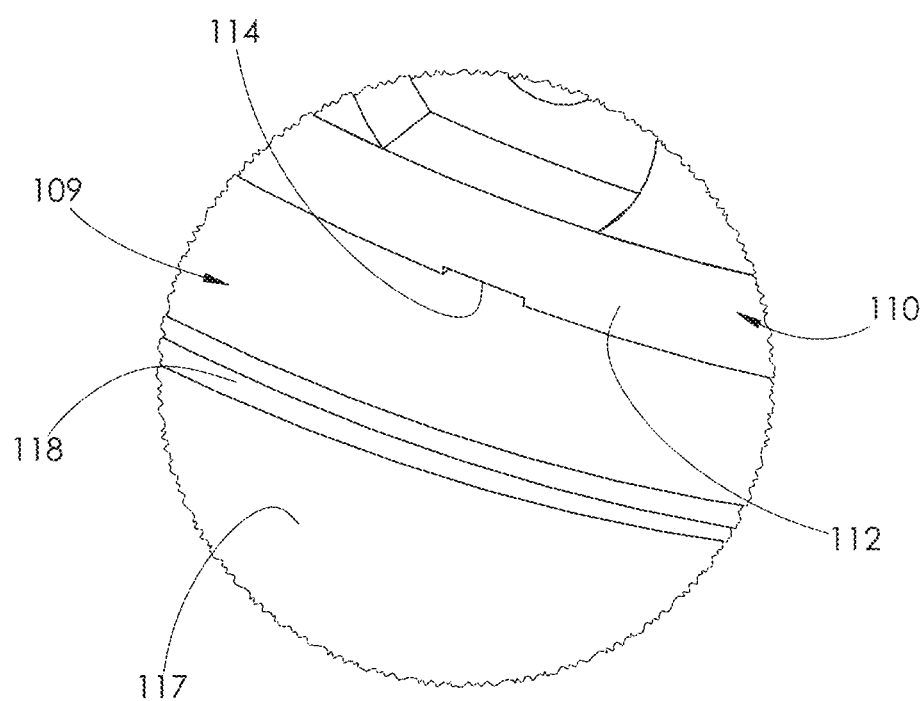
FIG. 4 is an enlarged view of area B, shown in FIG. 3.
Figure 5:
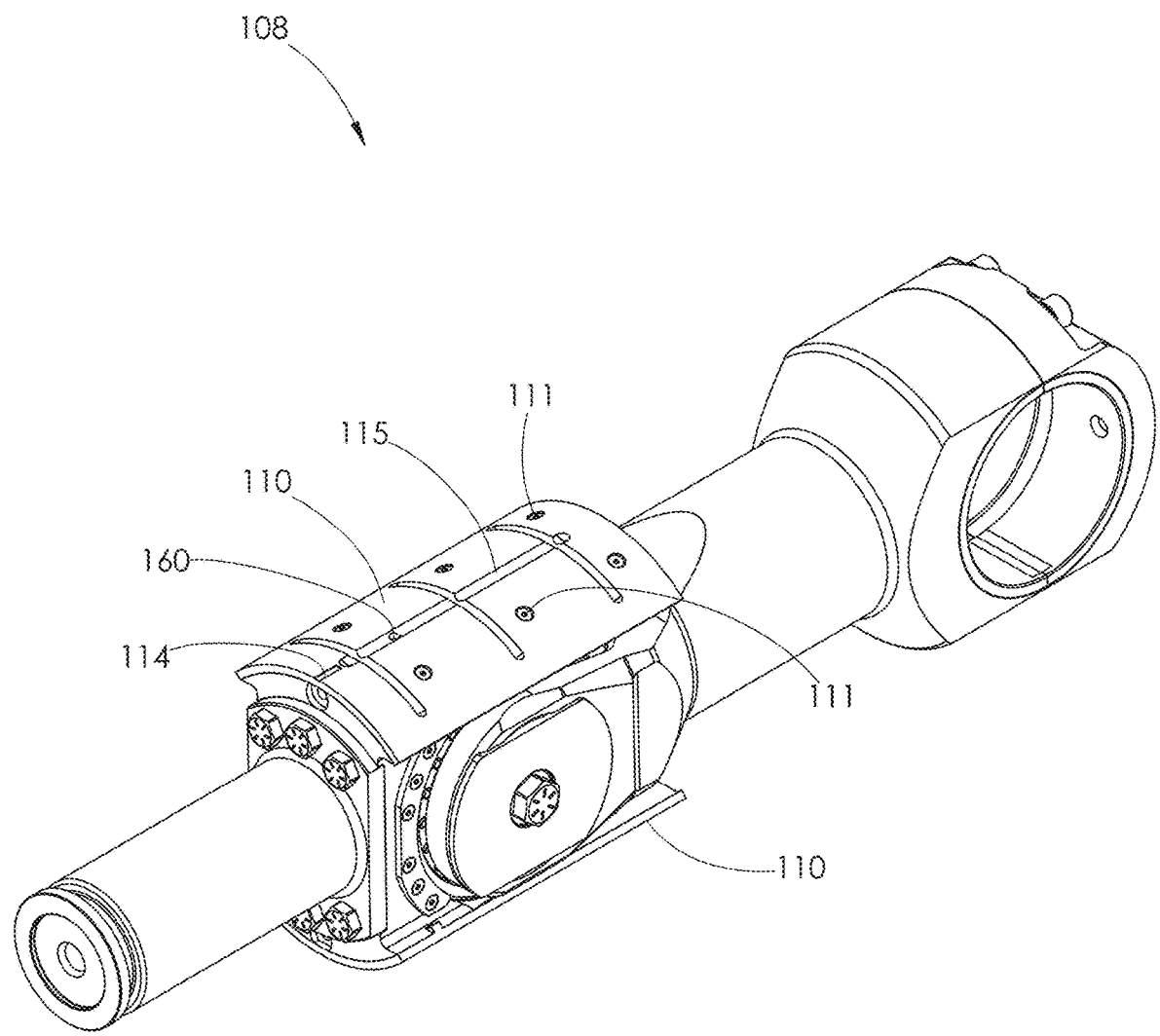
FIG. 5 is a front perspective view of one embodiment of a linear drive assembly disclosed herein.
Figure 6:
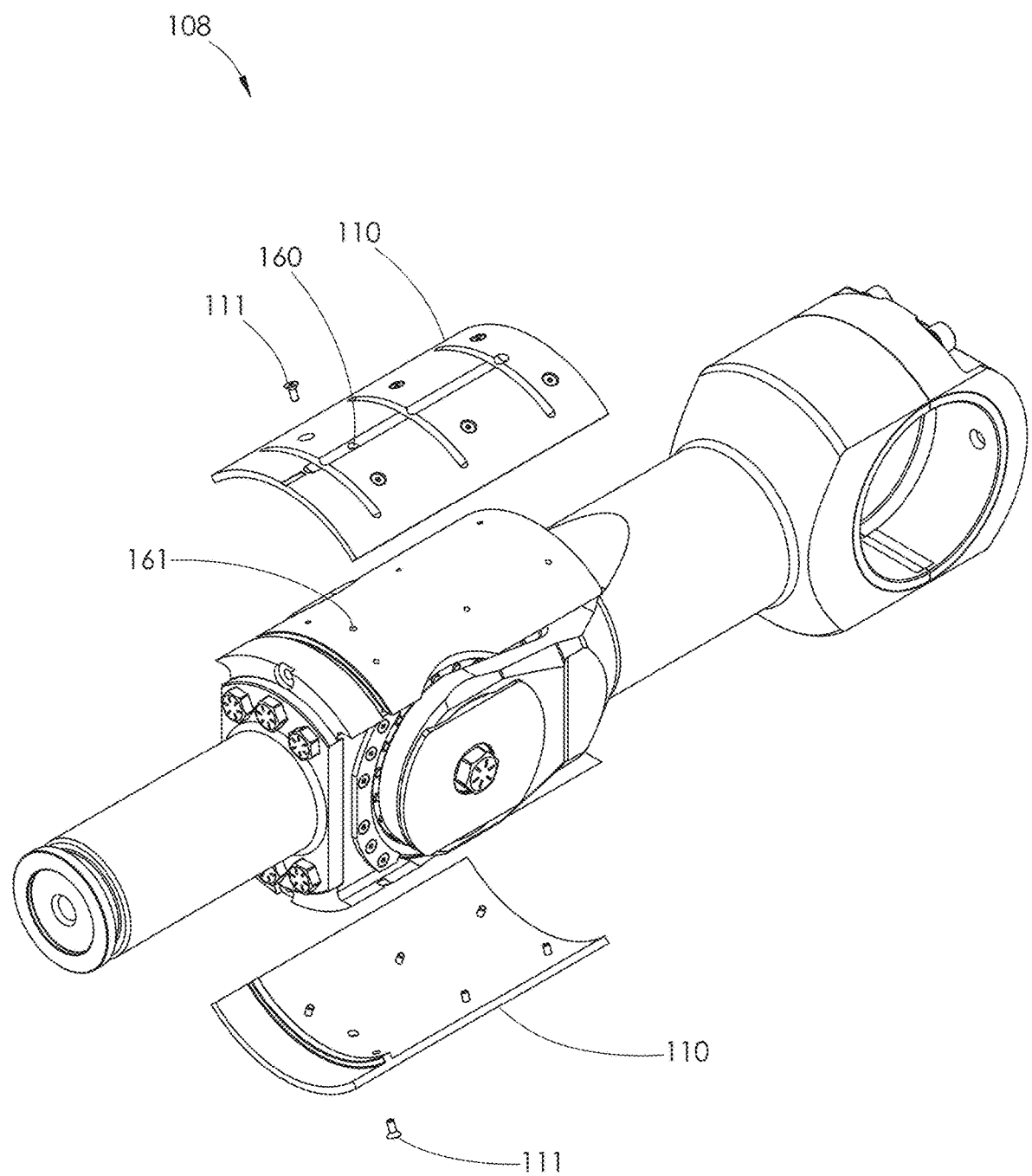
FIG. 6 is a front perspective view of the linear drive assembly shown in FIG. 5 with the wear plate and wear plate fasteners shown exploded from the assembly.

Referring now to FIGS. 2-4, during maintenance operations in which the pony rod cover 107 is removed the operator may visually determine the amount of wear on both the crosshead bore 109 and the wear plates 110. To determine the amount of wear on the wear plates 110 the operator observes the wear indicator groove 114 as shown in FIG. 4. If the wear indicator groove 114 is still observable then the wear plate 110 still has usable life and need not be replaced. If no wear indicator groove 114 can be seen, the wear plate 110 should be replaced or the linear drive assembly 108 flipped. Since it is expected that the operator knows the depth of the wear indicator groove 114 in a new wear plate 110 the depth of the observed wear indicator groove 114 will provide the operator an indication of the approximate remaining life of the wear plate 110. For instance, if the operator observes the depth of the wear indicator groove 114 to be approximately half that of a new one after fifty hours of operation, the operator can assume that the wear plate 110 will provide another fifty hours of operational life and re-check the wear plates 110 at that time.

Continuing with FIGS. 2-4, the amount of wear on the crosshead bore 109 may be determined by operator observation when the pony rod cover 107 is removed. If the operator can still see the wear indicator groove 118 in the crosshead bore 109 then the crosshead guide 106 need not be replaced. As with the wear plate 110 an estimate of remaining life may be made by comparing the observed depth of the wear indicator groove 118 to that of a new one and assuming a linear, or other known, rate of wear.

The various features and alternative details of construction of the apparatuses described herein for the practice of the present technology will readily occur to the skilled artisan in view of the foregoing discussion. It is to be understood that even though numerous characteristics and advantages of various embodiments of the present technology have been set forth in the foregoing description, together with details of the structure and function of various embodiments of the technology, this detailed description is illustrative only, and changes may be made in detail. Changes may especially be made in matters of structure and arrangements of parts within the principles of the present technology to the full extent indicated by the broad general meaning of the terms in which the appended claims are expressed.

The invention claimed is:

1. A kit, comprising:
   a crosshead guide having a longitudinal bore formed therein, the crosshead guide defining a wear indicator groove formed within a wall of the longitudinal bore;
   a linear drive assembly configured to be installed within the longitudinal bore of the crosshead guide, the linear drive assembly comprising upper and lower surfaces;
   a first wear plate, configured for removable attachment to the upper surface of the linear drive assembly, the first wear plate defined by an inner surface conforming to the upper surface of the linear drive assembly, an outer surface and a front edge, wherein:
      at least one lubricant groove is formed within the outer surface of the first wear plate;
      a lubricant port interconnects the inner surface to the outer surface and intersects the at least one lubricant groove; and
      at least one wear groove is formed in the outer surface of the first wear plate, the at least one wear groove being distinct from the at least one lubricant groove;
   in which the wear indicator groove is observable when the linear drive assembly is installed within the crosshead guide.

2. The kit of claim 1 in which the at least one wear groove extends from the front edge of the first wear plate.

3. The kit of claim 1 in which the at least one wear groove is not in fluid communication with the lubricant groove.

4. The kit of claim 1 further comprising:
   a second wear plate, corresponding to and configured for removable attachment to the lower surface of the linear drive assembly, the second wear plate defined by an inner surface conforming to the lower surface of the linear drive assembly, an outer surface, and a front edge, wherein:
      at least one lubricant groove is formed within the outer surface of the second wear plate; and
      at least one wear groove is formed in the outer surface of the second wear plate, the at least one wear groove being distinct from the at least one lubricant groove.

5. An apparatus comprising:
   the kit of claim 4, wherein:
      the linear drive assembly is installed within the crosshead guide;
      the first wear plate is attached to the upper surface; and
      the second wear plate is attached to the lower surface of the linear drive assembly.

6. The apparatus of claim 5, wherein the at least one wear groove of the first wear plate and the at least one wear groove of the second wear plate are observable from an outside of the crosshead guide when the linear drive assembly is installed within the crosshead guide.

7. The kit of claim 1 in which the wear indicator groove has a depth of between 0.050 and 0.075 inches.

8. The kit of claim 1 wherein the at least one wear groove has a depth of between 0.050 and 0.075 inches.

9. The kit of claim 1 wherein the lubricant groove is defined by a first portion and at least one second portion, wherein the first portion is parallel to the longitudinal bore, and wherein the at least one second portion intersects the first portion and is substantially perpendicular to the first portion.

10. A power end assembly comprising:
    a crosshead section comprising at least one crosshead guide having an inwardly-facing wall;
    a linear drive assembly, comprising:

a crosshead configured to be installed within the at least one crosshead guide, the crosshead comprising upper and lower surfaces; and a pair of wear plates, each wear plate removably attached to a corresponding one of the upper and lower surface of the crosshead, each wear plate having an outer surface and a front edge and comprising:

at least one lubricant groove formed in the outer surface of the wear plate, the at least one lubricant groove in fluid communication with lubricant ports formed in the crosshead; and at least one plate wear groove formed in the outer surface of the wear plate, the plate wear groove distinct from the at least one lubricant groove and not in fluid communication with any lubricant port formed in the crosshead;

in which the at least one plate wear groove opens on the front edge of the wear plate;

in which the linear drive assembly is installed within the at least one crosshead guide such that the front edge of the at least one wear plate is observable when installed within the at least one crosshead guide;

in which the at least one crosshead guide further comprises:

a crosshead bore sized to receive the linear drive assembly; and a guide wear groove formed in the inwardly-facing wall of the at least one crosshead guide surrounding the crosshead bore and observable when the linear drive assembly is installed within the at least one crosshead guide.

11. The power end of claim 10 wherein the guide wear groove has a depth between 0.050 and 0.075 inches.

12. A method of using the power end assembly of claim 10 comprising:

without removing the linear drive assembly from the at least one crosshead guide, observing the front edge of the at least one wear plate; and if the plate wear groove is not observable, replacing the at least one wear plate.

13. The method of claim 12 further comprising:

if the plate wear groove is observable, measuring a depth of the plate wear groove; and estimating a remaining life of the wear plate based upon the measured depth of the plate wear groove.

14. The method of claim 12 further comprising:

observing the guide wear groove; and if the guide wear groove is not observable, replacing the at least one crosshead guide.

15. The method of claim 14 further comprising;

if the guide wear groove is observable, measuring a depth of the guide wear groove; and estimating a remaining life of the at least one crosshead guide based upon the measured depth of the guide wear groove.

16. The power end of claim 10 in which the guide wear groove is circumferential.

\* \* \* \* \*